Figure 1:
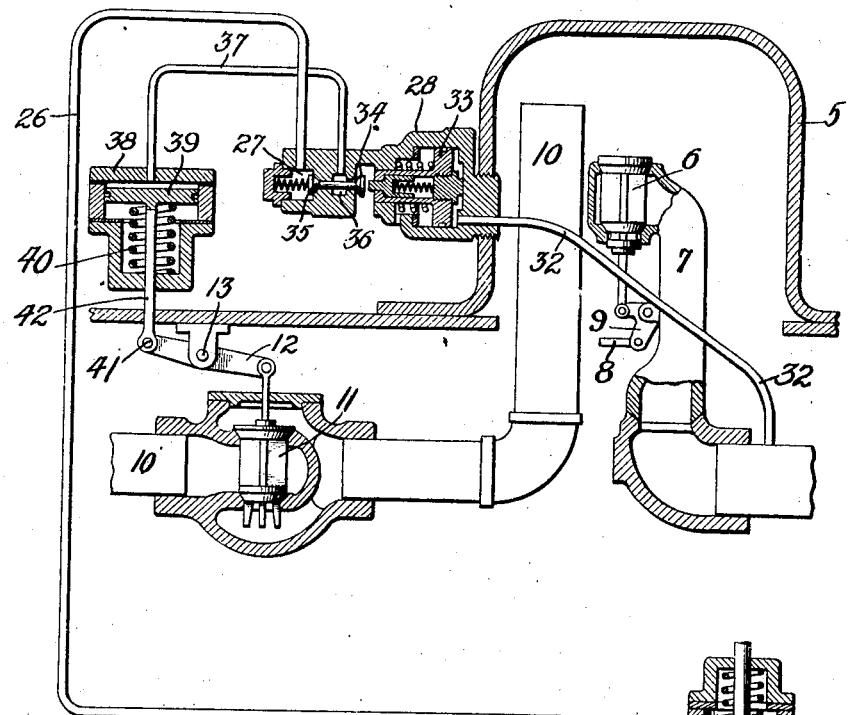
Figure 1:
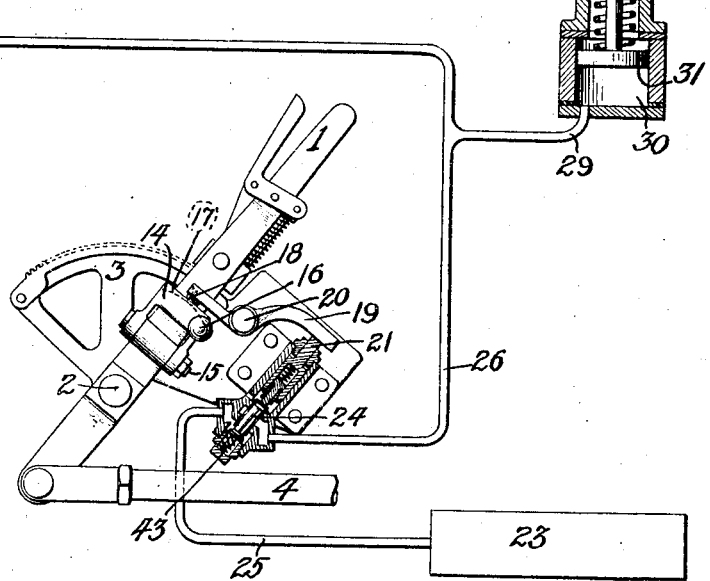

Dec. 11, 1923.

M. H. ROBERTS 1,476,729

APPARATUS FOR OPERATING BOOSTER SUPPLEMENTED LOCOMOTIVES

Filed June 10, 1922    2 Sheets-Sheet 1

WITNESS
Gustav Genzlinger

INVENTOR
Montague H. Roberts
BY Synnestvedt & Lechner
ATTORNEYS

Dec. 11, 1923.
M. H. ROBERTS
1,476,729
APPARATUS FOR OPERATING BOOSTER SUPPLEMENTED LOCOMOTIVES
Filed June 10, 1922    2 Sheets-Sheet 2
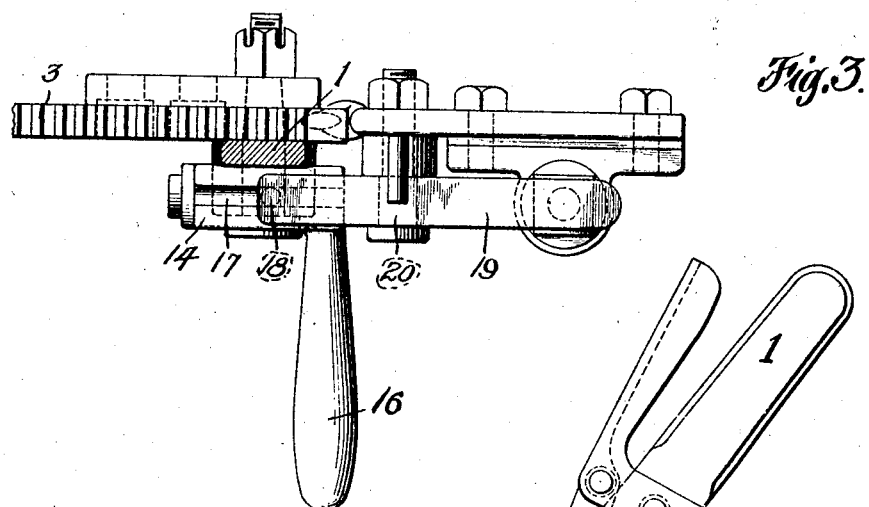
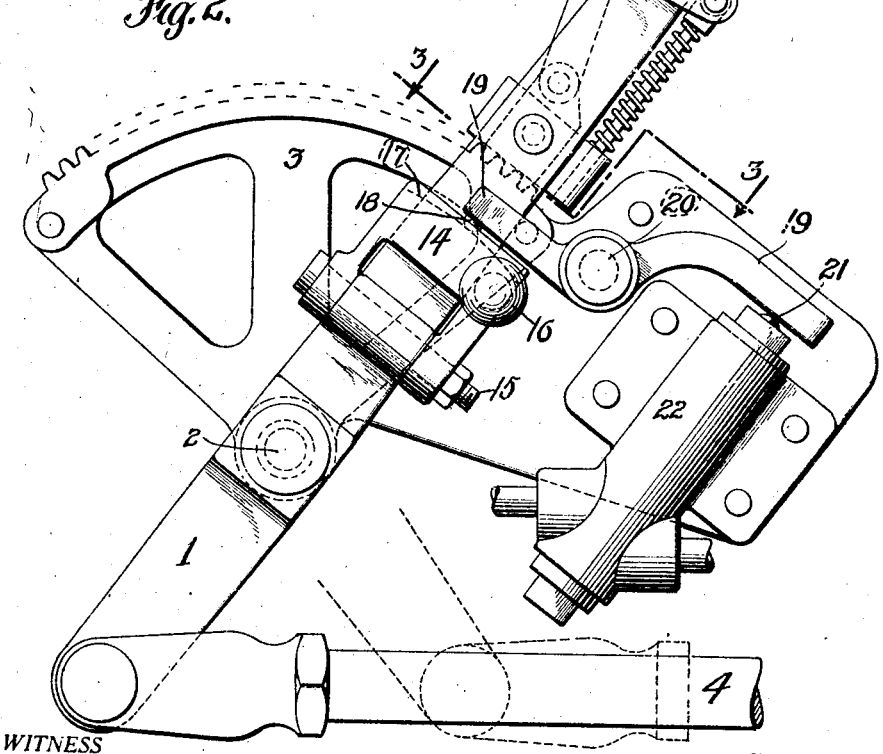
INVENTOR
Montague H. Roberts
BY Synnestvedt & Lechner
ATTORNEYS
WITNESS
Gustav Genzlinger.

Patented Dec. 11, 1923.

1,476,729

UNITED STATES PATENT OFFICE.

MONTAGUE H. ROBERTS, OF ENGLEWOOD, NEW JERSEY, ASSIGNOR TO FRANKLIN RAILWAY SUPPLY COMPANY, A CORPORATION OF DELAWARE.

APPARATUS FOR OPERATING BOOSTER-SUPPLEMENTED LOCOMOTIVES.

Application filed June 10, 1922. Serial No. 567,290.

*To all whom it may concern:*

Be it known that I, MONTAGUE H. ROBERTS, a citizen of the United States, residing at Englewood, in the county of Bergen and State of New Jersey, have invented certain new and useful Improvements in Apparatus for Operating Booster-Supplemented Locomotives, of which the following is a specification.

This invention relates to booster supplemented locomotives such, for instance, as are illustrated in patent to Howard L. Ingersoll, No. 1,339,395, issued May 11th, 1920, and particularly to an improved method of and apparatus for operating such locomotives.

An object in view in the present invention is to equip a locomotive with a booster motor together with suitable means for controlling it without in any way disturbing, impairing, changing or modifying the normal functions and methods of operation of the locomotive.

Booster motors of the type contemplated herein and also as disclosed in the above mentioned patent are intended to aid the main locomotive in starting and when running at slow speeds particularly up a long heavy grade. They are preferably although not necessarily arranged to drive the wheels of a trailer truck which, although they carry considerable weight, normally are "dead" insofar as development of power is concerned. Trailer truck wheels are also of much smaller diameter than the main driving wheels and by arranging the booster motor to drive them a very great increase in the draw bar pull of a given locomotive can be effected. They are designed to be cut out as soon as the locomotive attains a certain predetermined speed say for example ten to twenty miles an hour. In the arrangement disclosed in the above mentioned patent it was intended to operate the booster motor only during such times as the reverse lever was moved into the corner as it is colloquially expressed and immediately upon hooking up or moving the reverse lever even so much as one notch away from the corner it was intended that the booster motor should be cut out.

It is the object of the present invention to provide apparatus for the operation of a booster supplemented locomotive such that the main engines may be operated expansively substantially during the period that the booster is supplementing them whereby steam will be available for operation of the booster motor without exceeding the boiler capacity while at the same time the net tractive effort is increased.

Another object of the invention is to utilize the air pressure generated by the main locomotive for the air brake system in providing a control for the booster motor of the character above specified.

These together with such other objects as are incident to my invention or may appear hereinafter I obtain by means of a construction which is illustrated in preferred form in the accompanying drawings, wherein:

Fig. 1 is a schematic diagram illustrating my improved booster controlling mechanism; Fig. 2 is a side elevation on an enlarged scale of the reverse lever of a locomotive showing the manner in which my improvement may be associated therewith; and Fig. 3 is a section on the line 3—3 of Fig. 2.

In Fig. 1 I have diagrammatically illustrated the reverse lever 1 of a locomotive which is pivoted at 2 for swinging movement across the quadrant 3 in a manner well known in this art. The reach rod 4 attached to the lower end of the rod 1 extends to the mechanism, whatever it may be, for altering the valve cut off for the main cylinders of the locomotive.

Within the dome 5 of the locomotive is located the usual main throttle valve 6 and dry pipe 7 leading to the main cylinder valve chests. The throttle is operated in much the usual manner from the cab (not shown) through the medium of the rod 8 and the bell crank lever 9.

From the dome 5 there also extends the booster motor steam supply pipe 10 in which is located any suitable throttle valve 11 adapted to be opened when the lever 12, which is pivoted at 13, is rocked downwardly at its left hand end in a manner hereinafter to be described.

The booster motor, of course, is not designed nor intended to run the locomotive by itself and I therefore prefer to arrange its controlling devices in such manner that it will be impossible to cut in the booster motor until after the main cylinders of the locomotive are in operation. I therefore associate the controlling mechanism for the booster motor with some moving part of the controlling mechanism for the main locomotive and I prefer and have shown it as associated with the reverse lever 1 of the main locomotive although it might be associated with some other part of a reverse mechanism.

When the engineman starts the main locomotive he moves the reverse lever 1 into the corner as it is colloquially expressed. If he desires the booster motor to be thrown into operation after steam has been admitted through the main throttle 6 he raises the latch or movable element 14 which is pivotally mounted upon the bolt 15 carried by the reverse lever to the position indicated in the drawings. For this purpose the latch or element 14 is provided with the handle 16. The normal position for this latch when the booster motor is not to be operated would be hanging downwardly out of the path of parts to be described later so that when the reverse lever were moved into the corner there would be no effect upon the controlling mechanism for the booster motor.

The position indicated in the drawings however is the position which it would occupy when it is intended to use the booster motor and in this position it will be noted that the channel or track 17 in the upper edge of the latch 14 is in position to engage the rounded protuberance 18 on the under face of the left hand end of lever 19 which is pivoted to the adjacent structure of the locomotive at 20. When the latch 14 is in its upper position as shown and the reverse lever 1 is moved into the corner also as shown the protuberance 18 will be engaged by the track 17 and the lever 19 rocked so that its right hand end will depress the plunger 21 in the valvular device 22 now to be described in association with other parts.

As stated I prefer to use my invention in connection with air pressure which may be obtained from the reservoir 23. When the plunger 21 is depressed the valve 24 is opened to establish communication between the pipe 25 leading from the reservoir 23 and the pipe 26 which latter pipe communicates with a chamber 27 in a valvular device 28. The pipe 26 also communicates with the pipe 29 leading to the chamber 30 below the piston 31 in a device known in this art as the booster entraining motor but which latter is not illustrated completely nor in detail for the reason that it forms no part of the present invention.

From the foregoing it will be seen that after the reverse lever has been moved into the corner air pressure from the reservoir 23 has reached the chamber 27 in the valvular device 28 provided, of course, that the latch 14 has previously been raised. Now as soon as the engineman manipulates the main throttle 6 steam pressure from the dry pipe 7 will be conducted through the by-pass 32 to the right-hand side of the piston 33 which latter will then be moved toward the left or in a direction to seat the valve 34 and unseat the valve 35, the valve 34 controlling simply a port to the atmosphere for purposes of exhaust. Communication for the air is now established from the pipe 26 through the chamber 27 to the chamber 36 and pipe 37 the latter discharging within the booster throttle operating cylinder 38 at the upper side of the piston 39. This piston is then moved downwardly against the pressure of the spring 40 and by means of the piston rod 42, pivoted at 41 to the lever 12, it rocks said lever 12 in a direction to open the booster throttle 11. Steam can now pass down through the pipe 10 to the cylinders of the booster motor not shown as the booster motor per se forms no part of the present invention.

The foregoing condition will continue until such time as the engineman pulls back or hooks up the reverse lever 1 to a position in which the protuberance 18 will ride out of the channel 17 whereupon the lever 19 will be rocked in a reverse direction under the pressure of the spring 43 in the primary control valve 22. Thus the primary control valve will close communication between pipes 25 and 26 and consequently cut off the supply of operating fluid to the booster throttle valve 38. The booster throttle valve 11 will then be closed by the spring 40 and consequently no more steam will be admitted to the cylinders of the booster motor.

I so control and proportion the parts 14 and 19 as to make it possible to operate the booster motor even when the reverse lever has been hooked up somewhat. There is, therefore, a certain range of movement of the reverse lever which is idle movement insofar as the function of the pivoted member 19 is concerned. In this way the main cylinders of the locomotive can be using steam expansively and still have the benefit of the booster motor's assistance. This is of particular advantage on long pulls as it helps to keep up the steam pressure in the boiler and still obtain the benefit of the booster engine.

It will of course be understood that the primary control valve 22 might be associated with some other moving part of the main controlling devices of the locomotive although I prefer to arrange the members as shown.

The invention herein may possibly be better understood and more thoroughly appreciated if the following facts be borne in mind. Normal operation of an ordinary locomotive requires the reverse lever after starting to be held in the corner until a certain speed has been attained. The boiler is designed to have sufficient capacity for this purpose. In a locomotive of a given type, however, supplemented by a booster such a procedure might drain the boiler especially on long slow pulls up heavy grades. I, therefore, propose to hook up the reverse lever of a booster supplemented locomotive prior to the time at which such step would normally be taken and allow it to work expansively while at the same time keeping the booster motor in effective operation. The net result is a greater draw bar pull without draining of the boiler than would otherwise be possible. The loss of power incident to working the main engines expansively is more than made up for by the added tractive effort of the booster motor.

I claim:

1. A controlling device for booster motors for locomotives comprising a moving part in the controlling mechanism for the main locomotive, a valve juxtaposed to the path of movement of said moving part, and a member adapted to maintain the valve in open position in certain predetermined positions of the moving part including a position in which steam in the main cylinders of the locomotive has begun to work expansively.

2. Controlling mechanism for a locomotive booster motor comprising in combination with the reverse lever, a pilot valve and a member pivoted to the adjacent structure and adapted to maintain the pilot valve in open position in certain predetermined positions of the reverse lever including a position in which steam in the main cylinders of the locomotive has begun to work expansively.

3. A controlling device for booster motors for locomotives comprising a moving part in the controlling mechanism for the main locomotive, said moving part having a movable element which is normally out of operative position, said element being operable at the volition of the engineman, a valve juxtaposed to the path of movement of said moving part, and a member intermediate the movable element and said valve adapted to hold the valve in open position in certain predetermined positions of the moving part including a position in which steam in the main cylinders of the locomotive has begun to work expansively.

4. A controlling mechanism for a locomotive booster motor comprising in combination with the reverse lever, a pilot valve, a movable latch on the lever, and a valve opening member pivoted so as to be engaged by the latch to open the valve.

5. In a controlling mechanism for locomotive booster motors the combination with a moving part in the locomotive reversing mechanism, of a pilot valve for the booster system, a pivoted member for opening said valve, and a latch member associated with the moving part adapted to actuate the pivoted member to open the valve.

6. In a controlling mechanism for locomotive booster motors the combination with a moving part in the locomotive reversing mechanism, of a pilot valve for the booster system, a pivoted member for opening said valve, and a latch member associated with the moving part adapted to actuate the pivoted member to open the valve said latch member and said pivoted member being so arranged and proportioned as to maintain the valve in open position in certain predetermined positions of the moving part including a position in which steam in the main cylinders of the locomotive has begun to work expansively.

7. In a controlling mechanism for locomotive booster motors the combination with a moving part in the locomotive reversing mechanism, of a pilot valve for the booster system, a pivoted member under the control of said moving part, and means permitting movement of the moving part while the booster motor is operating which movement is idle insofar as the function of the pivoted member is concerned.

In testimony whereof, I have hereunto signed my name.

MONTAGUE H. ROBERTS.